United States Patent [19]

Aubry et al.

[11] Patent Number: 4,821,983

[45] Date of Patent: Apr. 18, 1989

[54] SHOCK ABSORBING JACK, A STAY COMPRISING IT AND LANDING GEAR EQUIPPED WITH SUCH A STAY

[75] Inventors: Jacques A. Aubry, Cabries; Daniel A. Mauduit, Marignane, both of France

[73] Assignee: Aerospatiale Societe Nationale Industrielle, Paris, France

[21] Appl. No.: 130,816

[22] Filed: Dec. 9, 1987

[30] Foreign Application Priority Data

Dec. 12, 1986 [FR] France ............................ 86 17401

[51] Int. Cl.⁴ .......................................... B64C 25/60
[52] U.S. Cl. ......................... 244/104 FP; 244/104 R; 244/102 SS; 267/64.23; 188/313
[58] Field of Search ......... 244/102 R, 102 SS, 104 R, 244/104 FP; 267/64.15, 64.23, 64.25, 64.26, 64.27; 188/269, 298, 311, 312, 313; 293/133

[56] References Cited

U.S. PATENT DOCUMENTS

| | | | |
|---|---|---|---|
| 1,888,578 | 11/1932 | Wallace | 267/64.26 |
| 2,914,089 | 11/1959 | Allinquant | 267/64.27 |
| 3,083,000 | 3/1963 | Perdue | 267/64.26 |
| 3,140,085 | 7/1964 | de Carbon | 188/298 |
| 3,269,718 | 8/1966 | de Carbon | 188/298 |
| 3,887,174 | 6/1975 | Whelan et al. | 267/64.27 |
| 4,630,788 | 12/1986 | Veaux et al. | 244/102.55 |

FOREIGN PATENT DOCUMENTS

| | | |
|---|---|---|
| 051506 | 5/1982 | European Pat. Off. |
| 072323 | 2/1983 | European Pat. Off. |
| 2274834 | 1/1976 | France . |
| 2370196 | 6/1978 | France . |
| 2554415 | 5/1985 | France . |
| 668543 | 3/1952 | United Kingdom . |
| 726898 | 3/1955 | United Kingdom . |
| 2132313 | 7/1984 | United Kingdom . |

Primary Examiner—Sherman D. Basinger
Assistant Examiner—Rodney Corl
Attorney, Agent, or Firm—Armstrong, Nikaido, Marmelstein & Kubovcik

[57] ABSTRACT

The shock absorbing jack of the invention includes essentially a rod in which a sliding piston defines an extension chamber and which itself slides in a body by means of a piston defining a retraction chamber, the body including a throttling device and, on the side opposite the rod, two high and low pressure gas chambers, these chambers being separated by a membrane bearing, at rest, on a support with hemispherical perforated bottom.

23 Claims, 5 Drawing Sheets

SHOCK ABSORBING JACK, A STAY COMPRISING IT AND LANDING GEAR EQUIPPED WITH SUCH A STAY

BACKGROUND OF THE INVENTION

1. Field of the Invention

The present invention relates to a shock absorbing jack, intended more particularly, among other applications, for equipping aircraft landing gear, particularly for light aircraft or helicopters and more especially adapted to equipping the main so called pendulum landing gear, the shock absorbing jack being in this latter case disposed in a substantially vertical position and so that the shock absorbing function, that is to say the resilient and damped absorption of the descent energy of the aircraft during landing thereof is fulfilled by compression under load.

Numerous shock absorbing jack constructions have already been proposed for carrying out successively and/or simultaneously the following functions:

(1) the shock absorbing function, when the aircraft lands and/or taxies on the ground, following which the shock absorbing jack also supports the static load formed by the weight of the aircraft, when this latter is motionless on the ground, (2) the function of raising and lowering the landing gear, when the aircraft is in flight, respectively following take off or before landing, and (3) the functions of lowering and/or raising the aircraft, also known under the French name of "baraquage" (kneeling) and "contrebaraquage" as well as the return to the normal position, with the undercarriage down, by means of appropriate hydraulic controls, "baraquage" and "contrebaraquage" being defined as operations which consist respectively in lowering or raising the aircraft resting on the ground contact members, such as wheels, with which these landing gear are equipped, beyond the normal position of the aircraft, so as to facilitate certain manoeuvers or to improve certain characteristics of the aircraft.

"Baraqage" in particular facilitates the loading then the transporting of an aircraft in the hold of a cargo carrying aircraft or in a hangar of an aircraft carrying ship. It also improves the stability of said helicopter resting on the deck of a helicopter carrier, aircraft carrier or other ships, even on an offshore platform, because the center of gravity of the helicopter is lowered following lowering thereof, reducing its ground clearance which in addition facilitates anchorage thereof to its parking area.

"Contrebaraquage" of the main landing gear makes it possible in particular to raise the rear of the apparatus and, in the case where this latter is equipped with a rear loading door, to increase the passage height under the tail for loading a vehicle.

2. Description of the prior art

Shock absorbing jacks of this type are described in the French patents and patent applications Nos. 2 340 482, 2 370 196, 2 461 852, 2 493 444 and 2 554 415.

Figures 1, 1A, 1B:
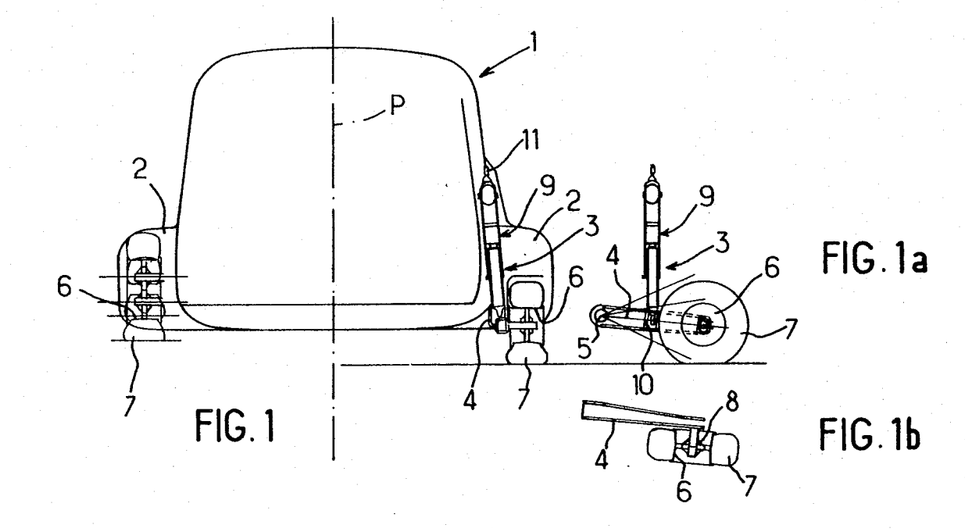
FIG. 1 is a schematical view, in section through a transverse plane of the fuselage substantially at the level of the main landing gears of a helicopter whose main landing gears are each equipped with a strut comprising a shock absorbing jack.
FIG. 1a is a schematical view, partially in section and partly in side elevation, of a main landing gear of the helicopter of FIG. 1.
FIG. 1b is a schematical sectional view of the leg and of the wheel of the landing gear of FIG. 1a, FIG. 2 is an axial sectional view of the strut shock absorbing jack, in the relaxed position, of the landing gear of the preceding Figures.

FIG. 1 of French patent No. 2 340 482 shows a shock absorbing jack whose shock absorbing function is fulfilled by compression under load, and which is formed essentially of the following elements:

a shock absorber rod, fixed by its upper end to the structure of the aircraft, and the lower end of which carries a piston with a throttling device with throttling orifices and a flap also pierced with throttling orifices, facing a peripheral chamber defined in the shock absorbing rod which is hollow about an internal cylindrical wall defining a central chamber vented to the atmosphere through a channel passing through the upper end, a jack rod, which is hollow and whose internal volume is subdivided into two chambers by a transverse dividing wall, so that the part of the jack rod which surrounds the upper chamber forms a shock absorbing body, in which the shock absorber rod is mounted for sliding with sealing by its piston, this upper chamber of the jack rod containing a hydraulic liquid volume which, by passing through the throttling orifices, penetrates into the base of the peripheral chamber of the shock absorbing rod, and the lower end of the jack rod being formed as a jack piston, a jack cylinder, which is fixed by its lower end to a member of the landing gear carrying the ground contact elements, and in which the jack rod is slidably mounted with sealing by its jack piston, which defines, in the jack cylinder, on the one hand a lowering chamber which, when it is filled with hydraulic liquid, tends to push the jack rod out of the cylinder, so as to bring the landing gear into the undercarriage down position and which, on the other hand, defines with the jack rod and the jack cylinder an annular lifting chamber which, when it is supplied with hydraulic liquid, tends to cause the jack rod to enter the jack cylinder, while emptying the lowering chamber.

Locking of the shock absorbing jack in the "undercarriage down" position is provided either by hydraulic locking of the lowering chamber, filled with hydraulic liquid, or by mechanical locking provided for example by resilient claws carried by the jack cylinder and resiliently clipping behind a step defined by the lower part of the jack rods, a hydraulically controlled locking and unlocking cap being also provided in this case, in the annual lift chamber, so that the hydraulic liquid supply for this latter ensures first of all movement of the locking cap, against a resilient member, into the claw release position then, because of the pressure which develops in the lift chamber, entry of the piston and the jack rod into the jack cylinder, whose lowering chamber is emptied by a discharge valve with opening controlled by the pressurization of the lift chamber. This makes it possible to pass from the undercarriage down position to the undercarriage up position. Passing from the latter to the first of these two positions is obtained by controlling, conversely, the pressurization and filling of the lowering chamber, and emptying of the lift chamber, until operation of the mechanical locking device is obtained, or by providing hydraulic locking of the lowering chamber by a pressurization and holding valve. Operation of the shock absorber at the upper part of the jack rod is provided conventionally, any compression load on the shock absorbing jack causing the shock absorber rod to be driven into the jack rod and shock absorbing of this movement by dissipation of energy through throttling of the hydraulic liquid contained in the upper chamber of the jack rod and passing through the throttling orifices of the shock absorber piston in the peripheral chamber of the shock absorber rod, while compressing therein the low pressure gas chamber which it contains. After the shock absorber rod has been driven into the jack rod, expansion of the compressed low pressure gas chamber pushes the hydraulic liquid back from the shock absorber rod to the upper chamber of the jack rod, which tends to push the shock absorber rod out of the jack rod, with braking provided by throttling of the hydraulic liquid in the throttling orifices of the flap provided for this purpose. After landing, from the undercarriage down position, the shock absorbing jack is under a static load (shock absorber rod partially entered into the jack rod), and the shock absorbing rod is caused to pass into the kneeling gear configuration by controlling emptying of the lowering chamber, under the effect of the weight of the aircraft.

In order to further reduce the size of the shock absorbing jack in the undercarriage up configuration and, in particular, so that the size in this configuration is substantially the same as in the configuration of the undercarriage under static load, the shock absorbing jack further includes a retraction piston, mounted for sealingly sliding in the lower chamber of the jack rod, and carrying a hollow sleeve which passes through the transverse wall of the jack rod, the hydraulic liquid volume contained in its upper chamber, and the shock absorber piston, this sleeve having an upper stop by which it is slidingly mounted and retained in the central chamber of the internal cylindrical wall of the shock absorber rod. The retraction piston thus defines, on the one hand with the jack piston, a vented chamber in communication through the central passage of the sleeve with the central vented chamber of the shock absorber rod, and, on the other hand, with the tranverse wall of the jack rod, a retraction chamber of the shock absorber, so that, when this retraction chamber is supplied with hydraulic liquid, at the same time as the annular lift chamber, the retraction piston is moved towards the jack piston and, through its sleeve, pulls the shock absorber rod into the jack rod. The shock absorbing jack has then its minimum size, because its jack rod has entered the jack cylinder and because the shock absorber rod has partially entered the jack rod.

This construction, in which the lowering chamber of the jack has the additional advantage of extending the shock absorbing travel, in the case of an emergency landing, forms the subject matter of improvements which are described in the first certificate of addition No. 2 370 196 of the above mentioned patent.

These improvements consist essentially in the provision, at the lower part of the jack cylinder, of an additional chamber adjacent the lowering chamber, in which the additional chamber is separated by a separator piston, returned by resilient means against a first stop, so as to limit the volume of the lowering chamber and movable against resilient means under the effect of the expansion of the hydraulic fluid in the lowering chamber, so that the additional chamber forms a chamber for accumulating the expansion not only of the hydraulic fluid in the lowering chamber, but also of the hydrualic fluid in the lift chamber and in the retraction chamber, in communication with each other, if the part of the lower chamber of the jack rod which does not form the retraction chamber is placed in communication with the lowering chamber, that is to say if the jack piston is in fact an annular piston separating the lowering and lift chambers. The additional chamber may be filled with hydraulic liquid, contain a spring applying the separator piston against a stop corresponding to the base of the lowering chamber and be in communication with an expansion valve, making possible emptying of the accumulation chamber when the separator piston is moved against the spring by expansion of the hydraulic liquid, as well as resupplying the accumulation chamber during application of a lowering pressure in the lowering chamber. But, in an advantageous variant, the additional chamber contains a presssurized gas forming simultaeously a pneumatic spring, applying the separator piston against the corresponding stop, and an additional shock absorbing chamber whose effects are added to those of the oleopneumatic shock absorber at the upper part of the jack rod. In addition, the lowering chamber is connected to an overpressure valve making is possible to empty the lowering chamber when the jack rod is subjected to a force greater than a predetermined value, so that the shock absorbing jack behaves like a shock absorber with extended travel in the case of emergency landing. Finally, in a variant which has been constructed and equips certain of the applicant's helicopters the stop against which the separator piston is applied by the high pressure gas contained in the additional chamber is in the form of a transverse dividing wall internal to the jack cylinder and having at least one orifice opening onto at least one throttling flap situated between the dividing wall and the separator piston, so as to form a second shock absorber. In this case, the retraction chamber is fed through a channel formed inside an axial sleeve, integral with this dividing wall and so with the jack cylinder and sealingly sliding in the retraction piston, this sleeve having an enlarged head which itself sealingly slides inside the sheath integral with the retraction piston and retained in abutment in the shock absrober rod. Finally, a second channel formed in the sleeve places the internal channel defined in the sheath, closed at its upper end in the shock absorber rod and extending between this upper closed end and the enlarged head of the sleeve, in communication with the hydraulic liquid chamber of the second shock absorber, that is to say the chamber defined between the transverse dividing wall of the jack cylinder and the separator piston, so that the chamber inside the retraction sheath of the shock absorber rod in the jack rod forms an extension chamber for the hydraulic liquid in the liquid chamber of the high pressure shock absorber thus formed at the base of the shock absorbing jack. Thus a shock absorbing jack is obtained equipped with two shock absorbers, one of which, at the upper part, includes a low presssure gas chamber and the other of which, at the lower part, has a high pressure gas chamber, the two shock absorbers being separated by a jack, whose cylinder receives the high pressure gas chamber, this latter being actuated from the moment when the load of the low pressure gas chamber exceeds the inflation pressure of the high pressure gas chamber.

French patent No. 2 461 852 describes other shock absorbing jack constructions, shown in FIGS. 2 to 6, and which comprise a cylindrical body with two end chambers open axially to the outside, a jack rod mounted for sealingly sliding in the lower end chamber of the cylinder, and defining by its internal face and the external face of its part engaged in the cylinder respectively a lowering chamber and a lift chamber, which are respectively fed with hydraulic liquid for controlling the extension and retraction of the jack rod from or into the cylinder, and a shock absorber rod mounted for sealingly sliding in the upper end chamber of the cylinder, and containing a low pressure gas chamber adjacent a hydraulic liquid volume in communication with the hydraulic liquid contained in the upper end chamber of the cylinder through a throttling device, with which a shock absorber piston is provided, carried by the end of the shock absorber rod inside the cylinder.

In addition, these shock absorbing jacks comprise a mobile bottom, formed as a separator piston, on which is applied the pressure of the hydraulic liquid reigning in the upper chamber of the cylinder, and itself bearing against a force threshold element formed by a high pressure gas chamber, allowing a stroke of the mobile bottom, at the time of a compression load on the shock absorbing jack, from a force greater than a given threshold, corresponding to the inflation pressure of the high pressure gas chamber, and independently of the speed at which the shock absorber rod is driven into the cylinder.

Figures 3, 4:
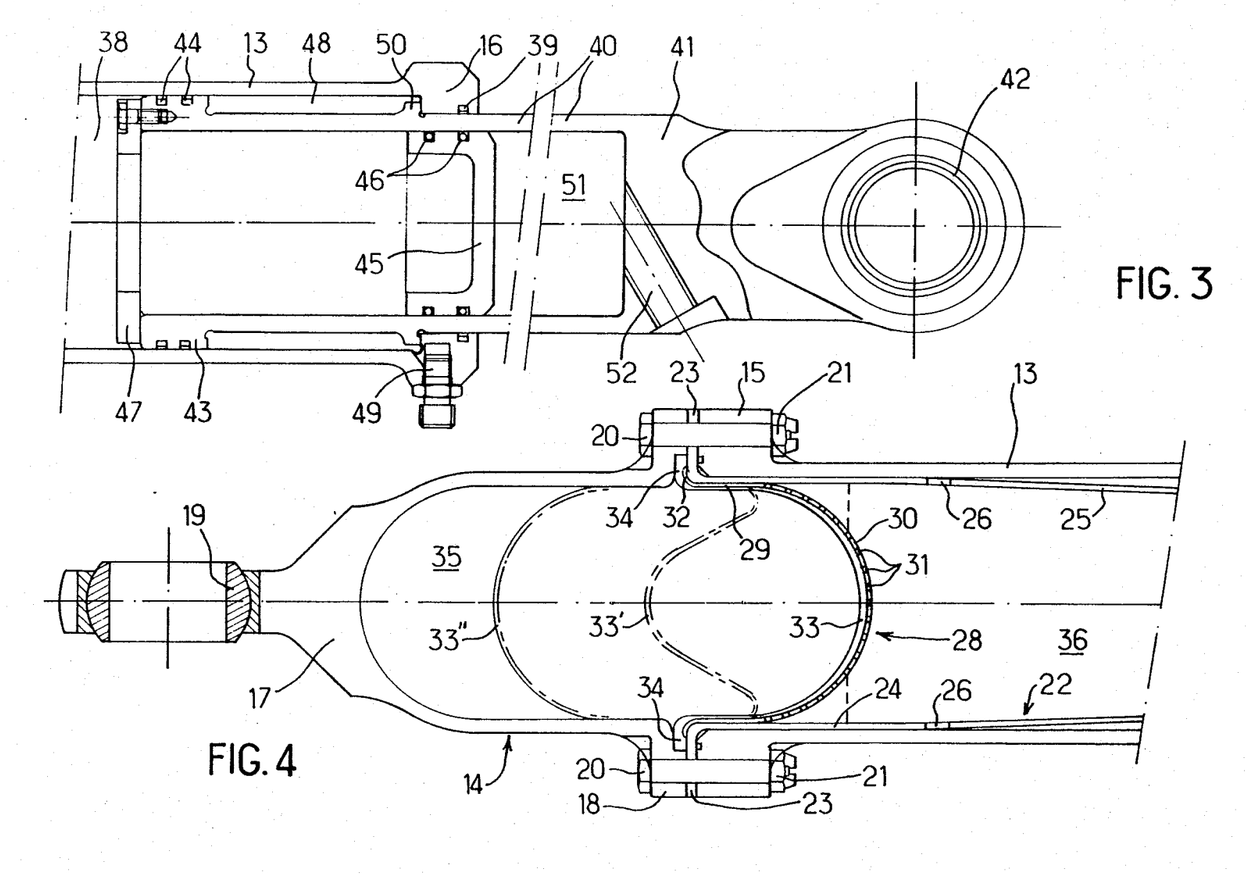
FIG. 3 is a partial sectional view on a larger scale of the ends of the rod and of a corresponding end of the body of the shock absorbing jack of FIG. 2.
FIG. 4 is a partial sectional view on a larger scale of the other end of the body of the shock absorbing jack.

In some embodiments (FIGS. 3 and 4), the two end chambers of the cylinder are separated by a fixed transverse dividing wall, through which pass channels for placing the upper end chamber of the cylinder in communication with a subsidiary chamber in which the mobile bottom and the high pressure chamber are housed, the subsidiary chamber being either an annuar chamber of the cylinder which substantially surrounds the upper end chamber of the cylinder and in which the mobile bottom adapted as an annular piston (FIG. 3) slides or the internal chamber of a bottle or capacity external to the cylinder and in which the mobile bottom slides (FIG. 4).

Figure 2:
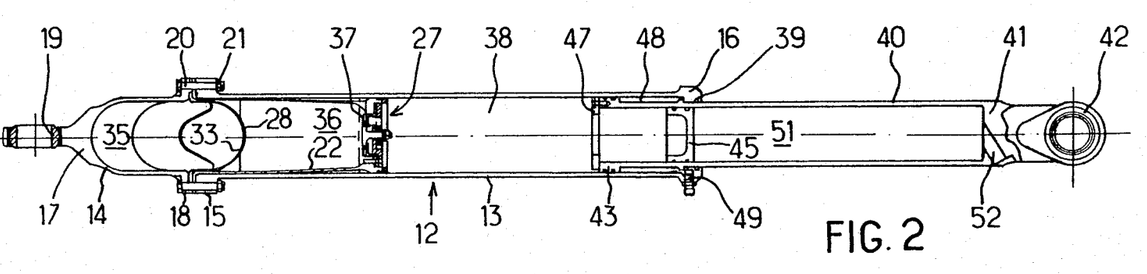
Figure 5:
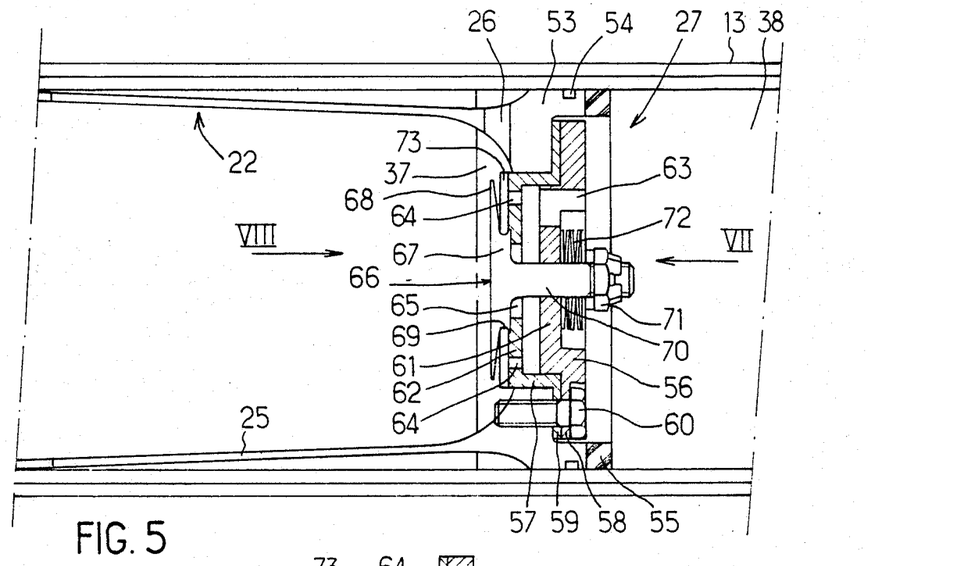
FIG. 5 is a partial axial sectional view of the throttling device of the shock absorbing jack.
Figure 6:
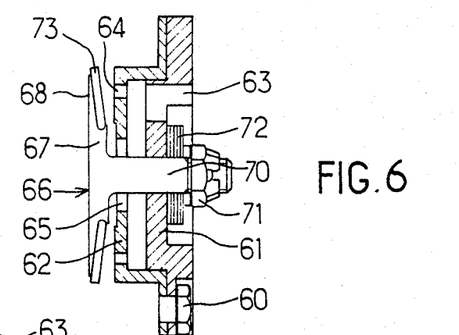
FIG. 6 is a partial axial sectional view of the device of FIG. 5, in another operating position.
Figure 7:
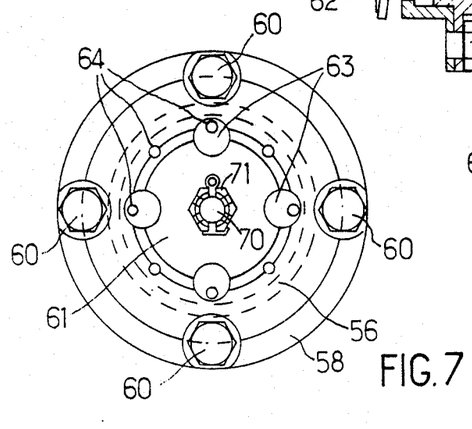
FIG. 7 is a view in the direction of the arrow VII of the throttling device of FIG. 5.

In other embodiments (FIGS. 2, 5 and 6), the high pressure gas chamber is disposed in the cylinder, between the two end chambers thereof. In this case, the mobile bottom may form the bottom of the upper end chamber and the high pressure gas chamber is defined between the mobile bottom and a fixed transverse dividing wall of the cylinder, which forms the bottom of the lower end chamber (FIG. 2). Furthermore, a separator piston is advantageously mounted for sealingly sliding inside the jack rod for separating the lowering chamber, thus defined in the jack rod, from the adjacent volume of hydraulic liquid retained in the lower end chamber of the cylinder and in communication with the hydraulic liquid of the upper end chamber through a hollow rod which is carried by the transverse dividing wall, passes through the high pressure gas chamber and about which the mobile bottom is mounted for sealingly sliding (FIG. 5). Finally, it is possible for the bottom of the upper end chamber to be formed by the fixed transverse dividing wall of the cylinder, whereas the bottom of the lower end chamber is formed by the mobile bottom, separating the high pressure gas chamber housed between the mobile bottom and the fixed dividing wall, of the hyraulic liquid volume contained in the lower end chamber and in communication with the liquid of the upper end chamber through the hollow rod carried by the fixed dividing wall (FIG. 6).

In these different constructions, a retraction piston is mounted for sealingly sliding in the upper end chamber and about the part of the shock absorber rod which is engaged in the cylinder, and this retraction piston defines a retraction chamber which, when it is supplied with pressurized hydraulic liquid, controls the retraction of the shock absorber rod into the cylinder by means of the retraction piston. Similarly, retraction of the jack rod into the cylinder may be provided by another retraction piston, mounted for sealingingly sliding in the lower end chamber and about the part of the jack rod which is engaged in the cylinder so as to define the retraction chamber.

French patent No. 2,493,444 concerns improvements made to the shock absorber part of devices such as the shock absorbing jacks forming the subject of the above mentioned patents. These improvements consist essentially in an additional separator piston mounted for sealingly sliding inside the shock absorber rod and separating the low pressure gas chamber, at the lower part in this rod, from a hydraulic liquid volume, at the top part in this rod, and a hydraulic distributor block, external to the shock absorber, is in communication with the top part of the shock absorber rod, so as to cause the hydrualic liquid volume which it contains to vary, the separator piston sealingly sliding about a hollow axial rod, internal to the shock absorber rod, and causing the low pressure gas chamber to communicate with a connection duct to a pressurized gas source. Furthermore, the hydraulic distributor block controls the emptying of the hydraulic liquid from the top part inside the shock absorber rod when this latter is urged by the corresponding retraction piston and is driven into the cylinder. Finally, French patent No. 2,554,415 provides a shock absorber jack for landing gear which allows lowering under the effect of the weight of the aircraft itself and return to the "undercarriage down" position on the ground, but which does not fulfill the function of a jack providing lifting or retraction of the landing geaer during flight. In fact, this patent relates specifically to a forward and orientable landing gear equipped with a shock absorbing jack having a single low pressure gas chamber and which is mounted in a case pivoting on the structure of the aircraft, so as to make possible the up or down position of the front landing gear by pivoting about a transverse and fixed shaft of the structure, and not by reduction of the axial dimension of the shock absorbing jack.

The shock absorbing jack comprises a rod, formed of two coaxial tubes o different sections, connected together by a bottom at one of their ends, a cylinder with closed bottom, containing hydraulic liquid and sliding between the two tubes and whose open end engaged between the two tubes forms an annular piston, the shock absorbing jack also comprising a throttling device carried by the end of the internal tube engaged in the cylinder, a low pressure gas chamber contained in the internal tube between a hydraulic liquid chamber in communication with the one contained in the cylinder through throttling orifices, and a separator piston sealingly sliding in the internal tube so as to separate the low pressure gas chamber from a hydraulic liquid chamber connected to a hydraulic block. The rod is mounted for axial sliding in a case which defines with the external tube a jack chamber, normally filled with hydraulic liquid, and which is emptied towards the hydraulic block, on lowering under the effect of the weight of the aircraft, so that in the lowered position, the upper part of the rod extends above the case, the return to the "undercarriage down" position under a static load on the ground, being provided by filling this chamber.

The projection of the upper part of the rod above the case, in the lowered position, is a configuration which is not admissible in main landing gear, particularly for helicopters, of the direct sliding type, in which the shock absorbing jack is housed in the shock absorber leg, like the "pendulum", in which the shock absorber rod is housed in a resilient manoeuvering strut, when the leg or the strut respectively must be slanted from the outside towards the inside and from bottom to top with respect to the vertical, longitudinal and median plane of the aircraft.

All the constructions described in the above mentioned patents have the common drawback that their structure and operating mode are complex. In particular, they include a relatively large number of pistons and other sealingly sliding members forming pistons as well as a large number of dynamic seals and, generally, a large number of mechanical components. The result is that the manufacturing, fitting and maintenance costs are high, and that the shock absorbing jacks obtained are heavy.

The problem underlying the invention consists in simplifying, to a large extent, the structure and operating principle of a shock absorbing jack, for equipping the landing gear of aircraft, in particular aircraft with rotating wings and fulfilling at one and the same time the functions of shock absorber with high energy absorption and of jack for raising and lowering the undercarriage, making possible the extra lowering and/or extra raising of the aircraft and, possibly, landing in the jack up position.

SUMMARY OF THE INVENTION

For this, the shock absorbing jack of the invention, of the type loaded under compression and comprising:

a cylindrical body, an axial end of which is open, a hollow cylindrical rod, an axial end of which is open and whose other axial end is closed by a bottom, intended to be connected to an unsuspended member of the landing gear, this rod being engaged by its open axial end portion in the open axial end of the body, and mounted for sealingly sliding therein, an annular piston, mounted for sealingly sliding inside the cylindrical body and moving therein with the rod portion internal to the body, while defining between the body and the rod an annular retraction chamber, which the annular piston isolates from a hydraulic fluid chamber contained in the body, and such that the pressurized hydraulic fluid supply of the annular retraction chamber controls retraction of the rod into the body, whereas emptying thereof causes extension of the rod from the body, a separator piston, mounted for sealingly sliding between two stops inside the rod in which is defined an extension chamber which the separator piston isolates from the hydraulic fluid contained in the body, and which, when it is supplied with pressurized hydraulic fluid, controls the extension of the rod out of the body, whereas emptying thereof causes the rod to retract into the body, a low pressure gas chamber, compressed by an adjacent volume of hydraulic fluid when the hydraulic fluid contained in the body is compressed by the annular piston and the separator piston, under the effect of compression loads exerted on the shock absorbing jack and causing the rod to retract into the body, a throttling device, housed in the body and braking the movements of the rod by throttling the hydraulic fluid contained therein, and a high pressure gas chamber, also housed in the body in which it is defined between a fixed wall of the body and a separator member which isolates it from the hydraulic fluid and from the low pressure gas chamber, and which is compressed as soon as the shock absorbing jack is subjected to a compression force greater than a threshold corresponding to a pressure of the gas in the low pressure chamber equal to the inflation pressure of the high pressure gas chamber, is characterized in that the low pressure gas chamber is housed in the body, between the throttling device and the high pressure gas chamber, from which it is only separated by the separator member, comprising a flexible membrane which bears, as long as the pressure of the gas in the low pressure chamber is not greater than the inflation pressure of the high pressure chamber, against a rigid and perforated support, fixed to the cylinder, and allowing the transmission of pressure from the low pressure chamber to the high pressure chamber through the membrane, while completely limiting the deformation of the membrane towards the low pressure chamber and the throttling device.

In such a construction since, on the one hand, the cylindrical body serves simultaneously both jack body and shock absorber body and since the rod, the annular piston and the separator piston serve simultaneously as shock absorber rod and piston and, on the other hand, since the high pressure chamber, the low presssure chamber, the gas tight membrane of these chambers, the support of the membrane and finally the throttling device occupy relative positions which lend themselves to the arrangement thereof as a pneumatic compression module, the result is that the shock absorbing jack of the invention has a simplified structure, including a small number of parts and making it possible to simplify and substantially lighten all the mechanical and hydraulic components of the shock absorbing jack which consequently leads to a very significant reduction of the weight and cost price thereof.

In an advantageous embodiment from the point of view of the distribution of pressures and the stresses in the membrane in its support, the rigid perforated support is an internal dividing wall substantially transversal to the body and which has a hemispheric bottom, whose concavity is turned towards the high pressure chamber, and which is pierced with a plurality of passage orifices. Moreover the flexible membrane is advantageously made from a rubbery, resiliently deformable material and it has a central part, which, in the rest position of the shock absorbing jack, has a hemispherical shape bearing against the concave face of the hemispheric bottom of the rigid perforated dividing wall.

In an advantageously simple embodiment, the fixed wall of the body which cooperates with the membrane for defining the high pressure chamber is formed by a fixed bottom for closing the axial end of the body on the side opposite the open end in which the rod is engaged.

In this case, in order to promote the modular construction of the shock absorbing jack, the body is advantageously formed by the axial assembly of a cylindrical sleeve and an end piece which has an internal recess, housing the high pressure gas chamber, closed on the side opposite the sleeve by a bottom with internal hemispheric and concave wall and opening into the sleeve through one end of the end piece which has a radial external flange by which the end piece is fixed to an external radial flange of the opposite end of the sleeve.

In an economic and simple embodiment, the separator member is formed solely by the membrane, which has a peripheral part by which it is sealingly fixed to the body and, when this latter is formed by the assembly of said cylindrical sleeve and said end piece, the peripheral portion by which the membrane is fixed to the body is advantageously an annular bead which is nipped between the flanges fixing the sleeve to the end piece.

Similarly, the rigid perforated support has a peripheral edge by which it is fixed directly to the body and, in the advantageous embodiment mentioned above, this peripheral edge of the support adapted as a perforated rigid dividing wall with hemisphierical bottom is an annular collar nipped between the flanges fixing the sleeve to the end piece and projecting radially outwardly from a truncated cylinder engaged in the sleeve and connected to the hemispheric bottom. Such a rigid perforated support structure, comprising an annular collar, a truncated cylinder and a hemispherical bottom, lends itself favorably to a metal or composite material construction.

Further advantageously, the throttling device is positioned in the body by means of a plastic deformation energy absorber, which is only urged after the rod has come into contact with the throttling device, which gives to the shock absorbing jack an additional energy dissipation capacity in the case of crash landing, by extending the shock absorbing travel and by the urging and deformation of the energy absorber. In a practical embodiment, this latter is preferably a tubular member, which is engaged in the cylindrical sleeve of the body, and which is secured to the throttling device by an axial end situated on the rod side, whereas its axial end situated on the end piece side has an external radial flange which is clamped between the fixing flanges of the sleeve and the end piece, so as to fix the position of this energy absorber, and so of the throttling device with respect to the body of the shock absorbing jack.

As is already known in shock absorbing jacks of the prior art, the throttling device advantageously comprises a throttling valve and orifice assembly having a passage section which is selectively variable as a function of the pressure of the hyraulic fluid and/or of the speed at which the rod is driven into the body, and of the direction by which the hydraulic fluid passes through this throttling assembly.

In order to facilitate mounting of this latter in the body, the throttling device preferably comprises an annular body for positioning this throttling valve orifice assembly in the cylindrical body, and forming a stop limiting the distance by which the rod is driven into the cylindrical body, under normal conditions of use of the shock absorbing jack, the annular body being disposed transversally in the cylindrical body and sealingly mounted by its external lateral wall therein, and the throttling valve and orifice assembly being mounted substantially inside the annular body.

In a preferred embodiment, suitable for low impact speeds on landing and making possible braking of the extension movements of the rod, in particular after take off, during the return of the shock absorbing jack to the relaxed position, the throttling valve and orifice assembly comprises a first disk pierced with a plurality of small throttling orifices and disposed transversally in a fixed position in the body, as well as a expansion braking valve, disposed on the same side as the first disk which is turned towards the gas chambers, and movable between two positions, one of which is a position spaced apart from the pierced disk, into which the braking valve is brought by compression of the hydraulic fluid, possibly beyond a first threshold, resulting from the engagement of the rod in the cylindrical body, so as to allow throttling under compression through the small orifices of the first pierced disk, and the other position of which is a position applied against the first disk, in which the braking valve, by the expansion of at least one gas chamber, is caused to close some of the small orifices in the first disk so as to allow throttling on expansion through the unclosed orifices only into the first disk, and thus to brake the extension movements of the rod from the cylindrical body.

But, in addition, so that the valve and throttling orifice assembly can also be used at high vertical impact speeds, the first disk is also pierced with at least one large orifice, having a passage section very much greater than that of the small throttling orifices, and which is normally closed by the obturator of an over pressure valve resiliently urged so as to apply the obturator against the first disk, and moved against resilient means which drive it so as to move the obturator away from the first disk and to allow the hydraulic fluid to pass through the large orifice or orifices, should an over pressure occur caused by the rod being driven at high speed into the body and exceeding an actuation threshold of the resilient means.

In a simple embodiment, the obturation of the over pressure valve is disposed on the same side as the first disk which is turned towards the gas chambers, and forms simultaneously an overpressure piston which is subjected to the presssure of the hydraulic fluid passing through the large orifice or orifices and on which a resultant force is exerted, antagonistic to the action of the resilient means urging the overpressure valve in the direction closing the large orifice or orifices.

Again advantageously, the over pressure valve forms simultaneously a support on which the expansion braking valve is movably mounted.

In an advantageously simple embodiment, this expansion braking valve is in the form of a circular ring having closure tongues projecting radially outwardly and each intended to close respectively one of those of the small throttling orifices which are to be closed by the expansion braking valve.

This latter is in addition mounted for pivoting by its internal radial edge in a peripheral groove opening radially outwardly and formed in the overpresssure valve. If the first pierced disk has a single large orifice about which the small throttling orifices are evenly spaced, the over pressure valve then advantageously is substantially in the form of a mushroom, whose cap has an internal radial part which forms the obturator and the over pressure piston of this valve, and which is separated by the peripheral groove, in which the internal radial edge of the expansion braking valve is engaged, from an external radial annular part forming an abutment for the expansion braking valve when this latter is moved away from the first disk, and the foot of the mushroom-shaped over-pressure valve extends axially, with a considerable radial clearance, through the large orifice of the first pierced disk and is mounted for sliding through a second disk pierced with throttling orifices of a passage section greater than that of the small orifices of the first pierced disk and spaced axially from the first disk on the side turned towards the rod, the end of the foot projecting towards the rod beyond the second disk and being threaded, and a nut is screwed onto this threaded end of the foot and forms a stop, against which bears one end of a compression spring whose other end bears against the second disk so as to return the over pressure valve axially towards the rod, for applying the obturator against the first pierced disk.

In this case, and when the valve and throttling orifice assembly is mounted in an annular body of the throttling device, the first and second pierced disks are the central disks of two plate shaped members clamped one against the other by their peripheral parts which are retained by members fixing the throttling device on this annular body.

The invention also provides a resilient control strut, intended for equipping an aircraft and which is characterized in that it comprises a shock absorbing jack of the invention, in which the bottom of the rod is integral with a swivelling end piece mounted on a non suspended member of the corresponding landing gear and in which the bottom of the cylindrical body is secured to a swiveling end piece for pivotally mounted on a structural suspended member connected to the structure of the aircraft.

Finally, the invention also provides a landing gear for aircraft, particularly for a main "pendular" landing gear for helicopters comprising:

a landing gear leg, mounted for pivoting about a stub shaft fixed to the structure of the aircraft, at least one tired wheel supported by the leg, and a manoeuvering strut for bracing the leg, said strut being pivoted by one end to a structural member connected to the structure of the aircraft and by the other end to the leg, between the wheel or wheels and the pivoting point of this leg on a stub axle fixed to the structure of the aircraft, and it is characterized in that the maneuvering and bracing strut is a strut according to the invention and such as presented above.

BRIEF DESCRIPTION OF THE DRAWINGS

The present invention will be better understood and other advantages and features will be clear from reading the following description of a preferred embodiment, with reference to the accompanying drawings in which:

FIG. 8 is a view in the direction of the arrow VIII of the throttling device of FIG. 5, and FIGS. 9 to 13 are views similar to FIG. 2 and show the shock absorbing jack in the different positions which it occupies, respectively, in the case of "hard" landing, in a position under a static load, in a lowered position on the ground or undercarriage up during flight, in a transitory position following a crash landing ("crash" configuration), and in a raised position on the ground.

DESCRIPTION OF THE PREFERRED EMBODIMENTS

In FIG. 1 there is shown at 1 the general silhouette in cross section of the fuselage of a helicopter with two lateral and lower fairings 2 each intended to house almost completely one of the main landing gears 3 of the undercarriage. Each landing gear 3 has, as shown also in FIGS. 1a and 1b, a metal or composite material leg 4, mounted as a pendulum, that is to say pivoting by its front end about a structural stub axle 5 fixed to the structure of fuselage 1 and having a horizontal and transverse axis (perpendicular to the vertical, longitudinal and median plane P of the fuselage).

By its rear end, leg 4 supports a wheel 6 with tire 7 and hydraulic wheel brake 8. The leg 4 thus equipped and mounted is braced by a resilient strut 9, for absorbing shocks and manoeuvering, which is pivotally mounted by its lower end in a fork joint 10 integral with leg 4 substantially in the middle thereof, and by its upper end to a structural fastening at a point 11 on the fuselage 1, so that strut 9 is slanted slightly from the inside towards the outside (with respect to plane P) and from top to bottom in a substantially vertical and transverse plane.

This strut 9 includes an oleopneumatic shock absorber having two gas chambers with high energy absorption on landing and a hydraulic control jack, controlling the lowering and raising of leg 4, so that wheel 6 may be brought out of the fairing 2 for landing and retracted almost completely into this fairing 2 during flight. Furthermore, this strut 9 is adapted as an integrated shock absorbing jack, further making it possible to lower the fuselage 1 of the helicopter by causing, from the undercarriage down position under a static load on the ground, shown in the half view at the right of FIG. 1, retraction of leg 4 and wheel 6 into the fairing 2 so that only the corresponding tire 7 projects under the fairing 2 and the floor of the helicopter, as shown in the half view on the left of FIG. 1.

This strut 9 may also raise the fuselage 1 of the helicopter by causing, from the undercarriage down position under static load on the ground, shown in the half view on the right of FIG. 1, an additional extension of strut 9 and consequently a lower angular position of leg 4, which causes the fuselage to be raised with respect to the ground.

Strut 9 adapted as a shock absorbing jack is described below with reference to FIGS. 2 to 4 and it includes a throttling device whose structure and operation will be described with reference to FIGS. 5 to 8, the operation of strut 9 being described with reference to FIGS. 2 and 9 to 13.

Referring to FIGS. 2 to 4, the shock absorbing jack includes a cylindrical body 12, formed by the assembly of a cylindrical sleeve 13 and an end piece 14. Sleeve 13 comprises, for ensuring resistance to tractive forces, a light alloy jacket with a hard inner coating and integrating, at its left hand end in FIG. 2, a radial external coupling flange 15 and, at its right hand end, a bearing 16 projecting radially inwardly and, to ensure resistance under pressure, the jacket is surrounded by a composite material binding formed by the circumferential winding of fibers for example aramide fibers, such as the fibers commercialized under the name KEVLAR, agglomerated by a polymerized synthetic resin.

End piece 14 is a truncated cylinder closed at one end by a bottom 17 with internal hemispherical face with its concavity turned towards the inside of the recess defined in end piece 14, whose other end is open and surrounded by an external radial flange 19 for coupling, by bolt 20-nut 21 assemblies, to the flange 15 of sleeve 13 so as to close this latter sealingly, and the bottom 17 of end piece 14 is extended by a swivel clevis for pivotally mounting strut 9 to the fixing point 11 on fuselage 1.

Between the flanges 15 and 18 fixing the end piece 14 to sleeve 13 is clamped a radial external flange 23 of a plastic deformation energy absorber 22, in the form of a cylindro-conical tube engaged axially in sleeve 13 (see FIG. 4). This tube 22 has a cylindrical section 24, adjacent flange 23, and engaged without appreciable radial play in sleeve 13, and a slightly truncated cone shaped section 25 which converges in the direction of bearing 16 and whose other end is secured to a throttling device 27, thus positioned axially in sleeve 13 and described below with reference to FIGS. 5 to 8.

In the cylindrical section 24 of tube 22 is engaged, without appreciable radial play, the cylindrical part 29 of a metal or composite material support 28 with a hemispherical bottom 30 pierced with numerous small holes 31 and having its convexity turned inwardly of sleeve 13 and towards the throttling device 27. This support 28 is retained axially in position by a collar 32 which is bent back radially outwardly at the end of the cylindrical part 29 on the side opposite the perforated bottom 30, and which is nipped between flange 23 of tube 22 and the peripheral and thickened bead 34 of a sealed member 33 made from a flexible and elastically deformable elastomer, which forms a sealing dividing wall internal to body 12 while being retained in position by its peripheral bead 34 sealingly nipped between flanges 15 and 18 (see FIG. 4).

Membrane 33 defines with the internal wall of end piece 14 a high pressure gas chamber 35, inflated with nitrogen, under a pressure of 10 MPa in the example chosen, and isolated by membrane 13 from an adjacent low pressure gas chamber 36, inflated with nitrogen under a pressure of 0.5 PMa, in the example chosen and defined in sleeve 13 between membrane 33 and a volume 37 of hydraulic oil which bathes the throttling device 27.

In the rest position of the shock absorbing jack (FIG. 2), because of the differential pressure exerted on membrane 33, this latter is applied against the support 28 (position shown with a continuous line in FIG. 4), which limits in an absolute way the movement and extension of membrane 33 towards the throttling device 27, so that the central part of membrane 13 also assumes a hemispherical shape.

The shock absorbing jack also comprises a hollow cylindrical rod 40, open axially at one end by which it is engaged and retained in sleeve 13, and whose other axial end is closed by a bottom 41, integrally formed with a swivel fork joint 42 for pivotally mounting strut 9 on the clevis 10 of leg 4 of the landing gear. Rod 40 is mounted for sliding sealingly axially and is guided in bearing 16 equipped with an O seal 39 (see FIG. 3) and in sleeve 13 through an annular piston 43, integral with the open end of rod 40 and projecting radially outwardly thereof, this annular piston 43 being equipped with two O seals 44.

A separator piston 45, also equipped with two O seals 46, is mounted for sealingly axially sliding in rod 40, between two axial stops one of which is the bottom 41 of the rod and the other an annular stop 47 screwed against the annular piston 43 and projecting radially inwardly of the bore of rod 40 (see FIG. 3). The annular piston 43 defines, between sleeve 13 and rod 40, a hydraulic annular chamber 48 which is isolated from the adjacent hydraulic oil chamber 38 extending into sleeve 13 as far as the throttling device 7, and in communication through this latter with the oil volume 37. Chamber 48 may be placed in communication with an external hydraulic circuit by the hydraulic connection 49 fixed in a radial bore formed in bearing 16 and opening into the annular chamber 48, whose minimum volume is determined by the axial position on rod 40 of an external radial stop 50 which limits the projection of rod 40 from body 12.

Similarly, a hydraulic chamber 51 is defined in rod 40 between its bottom 41 and the separator piston 45 which isolates this chamber 51 from the hydraulic oil of chamber 38 in body 12 and this chamber 51 may be placed in communication with an external hydraulic circuit by means of a connection fixed in bore 52 formed in the bottom 41 and opening into chamber 51.

The outlets or inlets of chambers 48 and 51, at 59 and 52, are connected through hydraulic locking valves (not shown) with an opening controlled by an electrovalve, to a hydraulic distributor block which supplies the chambers with pressurized hydraulic oil or allows them to be emptied towards a tank of the hydraulic circuit of the helicopter. Thus, the annular chamber 48 forms a chamber for retracting or raising the landing gear, which controls the retraction of rod 40 into body 12, by compressing the low pressure chamber 36 and, possibly, the high pressure chamber 35 by transfer of oil from chamber 38 to volume 37 through the throttling device 27 unless chamber 51 is placed in communication simultaneously with the tank and is emptied by movement of the separator piston 45 towards the bottom 41 or rod 40, under the thrust of the oil in chamber 38 which is driven out when rod 40 is driven into body 12 and is housed in rod 40. Convesely, chamber 51 forms a chamber for lowering or extending the landing gear, which controls the extension of rod 40 out of body 12 when it is supplied with pressurized oil, which pushes piston 45 back against stop 47 while compressing the oil in chamber 38 and if chamber 48 is placed simultaneously in communication with the tank, which pushes rod 40 back out of body 12 while emptying chamber 48 until stop 50 comes into contact against bearing 16.

Figure 8:
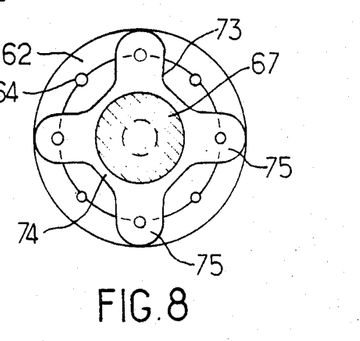

The throttling device 27 (see FIGS. 5 to 8) comprises a light alloy annular body 53 and a throttling valve and orifice assembly housed in the annular body 53 and thus positioned radially in sleeve 13. Body 53 is integrally formed with the end of the truncated cone shaped section 25, of tube 22 and is sealingly mounted in sleeve 13 by its lateral face equipped with a seal 54. On its face turned towards rod 40, the annular body 53 has an elastomer ring 15 against which rod 40 abuts in certain configurations of the shock absorbing jack which are mentioned below. The throttling assembly comprises two transverse elements 56 and 57, in the form of plates which are fitted one in the other and applied one against the other by their peripheral parts 58 and 59, bolted by four bolts 60 against the annular bottom of a recess in body 53 opening towards rod 40. The two elements 56 and 57 are dimensioned so that their central and flat disks 61 and 62 are spaced axially from each other. Disk 61, on the same side as chamber 38, is pierced with four large diameter throttling holes 63 spaced apart over its periphery, whereas disk 62, on the same side as the gas chambers, is pierced with eight small diameter throttling holes 64, spaced apart over its periphery and four of which are opposite the four holes 63 in disk 61. In addition, disk 52 is pierced with a central hole 65 of a diameter greater than that of the large holes 63. The throttling assembly also includes an overpressure valve 66, in the form of a mushroom whose cap, situated on the gas chamber side, has an internal radial portion 67 forming an over pressure piston and obturator for the central hole 65, and an external radial annular part 68, separated from part 67 by an annular groove 69, opening radially outwardly. The cylindrical foot 70 of valve 66 passes axially with appreciable radial play through hole 65 and slides through disk 61, and the end of the portion of foot 70 extending beyond disk 61 is threaded. A nut 71, screwed and pinned on this threaded end, forms a stop urged towards chamber 38 by a compression spring formed by a stack of conical resilient washers 72 engaged about foot 70, and bearing against disk 61, so that valve 66 is drawn resiliently axially towards the chamber 30a until hole 65 is closed by the obturator 67. Finally, an expansion braking valve 73 is mounted on valve 66. This valve 73, whose shape is clearly seen in FIG. 8, is a valve with an annular central part 74 engaged and pivoting by its internal radial edge in groove 69 of the mushroom valve 66. The valve 73 has four external and rounded radial tongues 75, which extend between the external radial part 68 of valve 66 and disk 62, so that each forms a mobile obturator for one of the small holes 64 of disk 62. In the normal position, shown in FIG. 5. Each of the four tongues 75 closes close the corresponding small holes 64, and obturator 67 of valve 66 closes the large hole 65. For low compression of the oil in chamber 38, corresponding to low speeds at which rod 40 is driven into body 12, the oil passes from chamber 38 to volume 37 through holes 36 and is throttled in the four unclosed holes 64, and it compresses the low pressure chamber 36. The expansion of this latter, resiliently returning rod 40 to its position of equilibrium in body 12, is then caused by the passage of oil from volume 37 to chamber 38, and throttling in the four same unclosed holes 64. For average and normal speeds at which rod 40 is driven into body 12, the presssure of the compressed oil in chamber 38, which is exerted through holes 64 on tongues 75 of valves 73, is sufficient to move the tongues 75 away and cause valve 73 to pivot in groove 69 until valve 73 comes into abutment against the external part 58 of valve 55. Throttling of the oil is then caused from chamber 38 to volume 37 through the eight small holes 64 in mem disk 62. After the compression phase of at least one gas chamber, its expansion pressurizes the oil in volume 37 which pushes valve 73 against disk 62 in a position in which four of the small holes 64 are closed by tongues 75, and throttling of the oil from volume 37 to chamber 38 takes place solely through the four small unclosed holes 74. There thus occurs braking of the extension of rod 40 under the effect of the expansion of the gas chambers. On the other hand, if the rod is suddenly driven at high speed into body 12, the presssure of the oil greatly compressed in chamber 38, and which is exerted through the small holes 64 and the large holes 65 in disk 62, is sufficient not only to move the braking valve 73 away from its stop 68 but also to move the obturator 67 away from disk 62 and to push the overpressure valve 66 back axially towards the gas chambers, against the resilient return force of the stack of resilient washers 72 which are compressed, as shown in FIG. 6.

The section for the passage of oil from chamber 38 to volume 37 is then maximum and prevents a detrimental over pressure from building up in chamber 38.

Figure 9:
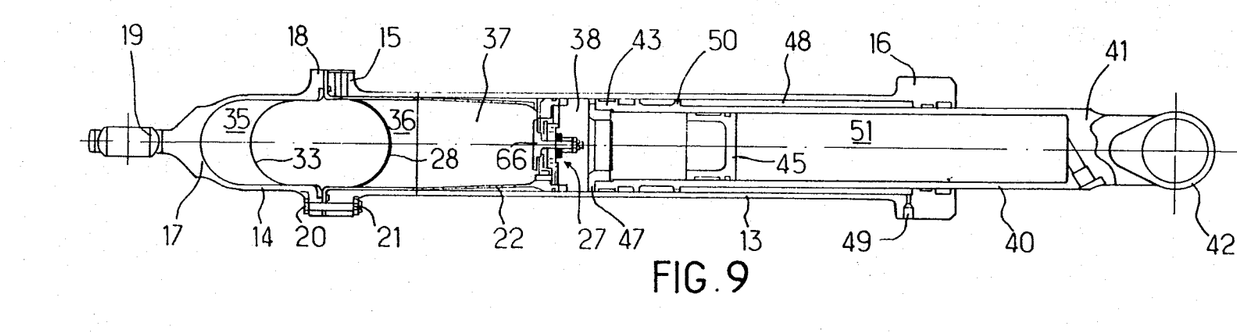
Figure 10:
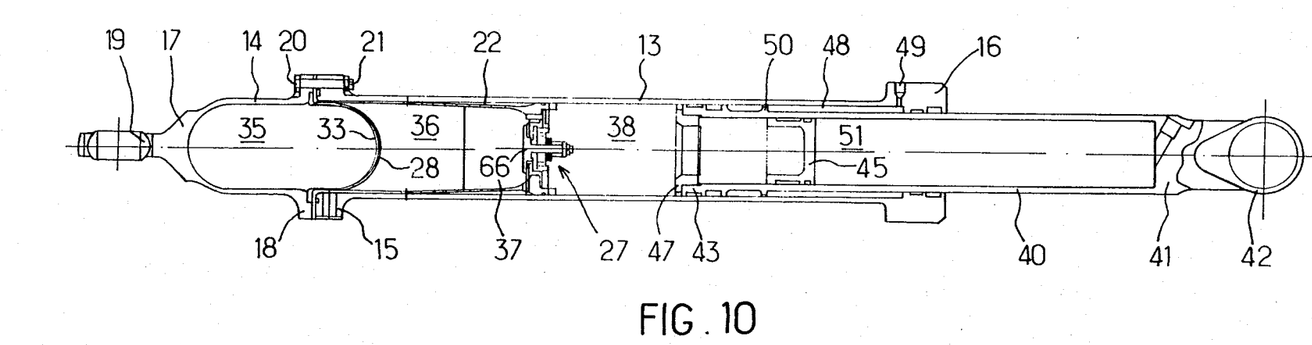
Figure 11:
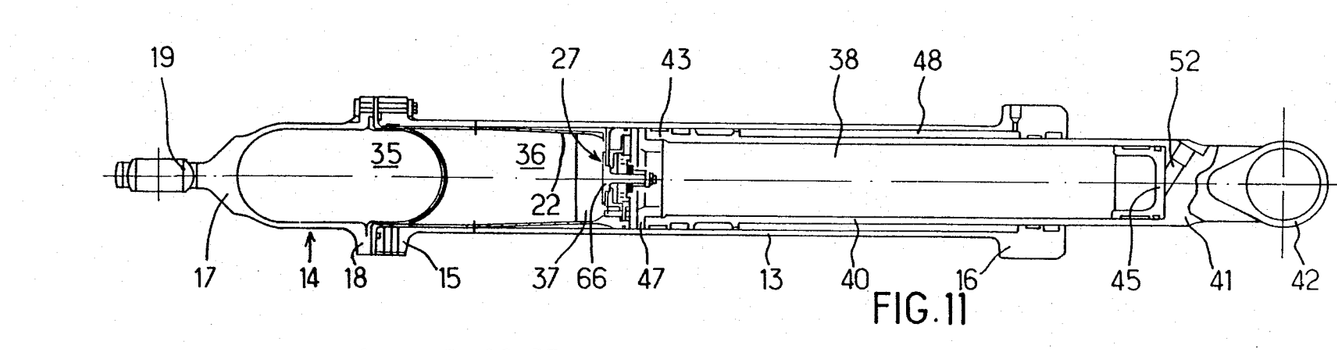

The shock absorbing jack, whose structure has just been described and which is distinguished essentially from known shock absorbing jacks by the integration of the high pressure 35 and low pressure 36 gas chambers, in a single chamber in the cylindrical body 12 which is divided by a sealed membrane 33, bearing on a rigid perforated support 28, and with a modulated architecture not only at the level of the pneumatic compression module thus formed, but also at the level of the throttling module 27 mounted at the end of tube 22 absorbing energy by plastic deformation in the case of a crash landing, operates in the following way: in so far as the shock absorbing function is concerned, the impact energy is absorbed by the compression of the inert gas (nitrogen) of one at least of the gas chambers 36 and 35 which behave like a spring. From the initial state, considered as being the state shown in FIG. 2, in which the shock absorber is expanded and the landing gear down in flight, in which state the nitrogen pressure in the high pressure chamber 35 is 10 MPa, the nitrogen pressure in the low pressure chamber 36 is 0.5 MPa and balanced with the oil pressure of 0.55 MPa in chamber 38, whereas the extension chamber 51 is filled with pressurized fluid so that the separator piston 45 is in an intermediate position in tube 40 and the raising chamber 48 is emptied, and membrane 33 bearing against its support 23, the impact energy on landing with a low vertical speed is absorbed by the low pressure chamber 36 from the position of the expanded shock absorbing jack, shown in FIG. 2 to the position which the shock absorbing jack will occupy under the static load of the weight of the aircraft on the ground, such as shown in FIG. 10, then by the high pressure gas chamber 35 from the compressed position under static load FIG. 10 to a highly compressed position, in the case of "hard" landing, as shown in FIG. 9. The penetration of rod 40 into the cylindrical body 12 causes, by pistons 43 and 45, compression of chamber 38 whose liquid is driven towards volume 37 through the throttling module 27 which brakes the flow by throttling through the small orifices 64 in disk 62, which brakes the penetration speed of rod 40 while compressing one at least of the gas chambers 35 and 36.

If the pressure corresponding to the impact force is less than 10 MPa balance will be achieved solely by compression of the low pressure chamber 36. Membrane 33 then remains bearing against its support 28. On the other hand, if the pressure corresponding to the impact force is greater than 10 MPa, a point of discontinuity in the curve of the driving in force of the twin chamber shock absorbers as a function of the stroke is passed through, and this discontinuity occurs when the pressure in the low pressure chamber 36 reaches 10 MPa and at that time there is equilibrium between the high pressure 35 and low pressure 36 chambers. These two chambers then behave as a single chamber which has an initial pressure of 10 MPa and an initial volume equal to the sum of the residual volume of the low pressure chamber 36 under a pressure of 10 MPa and of the initial volume of the high pressure chamber 35. It is this new chamber which serves as spring for the shock absorber, from the position of equilibrium, which corresponds to the position under static load on the ground, shown in FIG. 10, to the position of maximum compression in the case of a "hard" landing, shown in FIG. 9, in which piston 43 and the end of rod 40 are adjacent the throttling device 27, the pressure in the gas chambers possibly reaching more than 50 MPa. From the pressure of equilibrium of 10 MPa between the two chambers 36 and 35, for a slight increase in pressure, the membrane 33 will move away from its support 28 and will move to a greater or lesser degree, depending on the variation of volume, and without extending towards the bottom 17, while successively adopting the positions shown at 33' and 33" in FIG. 4.

After this compression phase, the expansion of chamber 36 or of the compression chambers 35 and 36 drives the oil from volume 37 to chamber 38 through the throttling device 27, which brakes the expansion, as explained above, by throttling through four small holes 64 not closed by valve 73, which brakes the expansion and the projection of rod 40 from body 12. This rod 40 and its pistons 43 and 45 are stabilized in the static load position shown in FIG. 10, and membrane 33 is applied against its support 28 if the pressure is less than 10 MPa in chamber 38.

In the case of impact with a high vertical speed (hard landing), the shock absorbing phase takes place substantially as described above in the case of low impact speeds, with the only difference being that, under the impact, the over pressure valve 63 is moved away from disk 62, as explained above, against spring 72, so that the throttling device 27 offers an increase of the throttling section, which avoids counterpressures which are too high in chamber 38. During the expansion phase, the throttling section in device 27 is identical to that of the expansion throttling mentioned above for low impact speeds, namely the four small holes 64 not closed by valve 73.

During all these manoeuvers, piston 45 is in the "mean" position, that is to say at a prescribed distance from stop 47 for chamber 51 is filled with hydraulic fluid and the valve in communication with bore 52 is hydraulically locked by the action of an electrovalve. Similarly, the valve in communication with end piece 49 is closed by an electrovalve so that in the annular chamber 48 there reigns a depression always less than or equal to 0.1 MPa.

From the static underload position (FIG. 10), take off of the helicopter brings the shock absorbing jack into the expanded position, shown in FIG. 2, by expansion of at least one gas chamber braked by the throttling device 27 as already explained above.

From the expanded shock absorber and undercarriage down position (FIG. 2), the landing gear is raised or retracted in the following way: at the beginning of the manoeuver, rod 40 is extended to the maximum, piston 45 is against stop 47, the pressure in chambers 38 and 36 is balanced at 0.5 MPa, the pressure in the high pressure chamber 35 is 10 MPa, the pressure in the chamber 51 is greater than 10 MPa, and the pressure in chamber 48 is substantially zero. The pilot then places chamber 51 in communication with the tank of the hydraulic circuit and chamber 48 in communication with the oil supply under a pressure $P_2$. Under the action of this pressure, rod 40 and piston 43 retract into the cylindrical body 12 and the pressure in chamber 38 pushes piston 45 back towards the bottom 41 and drives the oil from chamber 51. A position detector (not shown) stops the manoeuver in the landing gear up position, shown in FIG. 11. In this position, rod 40 and stop 47 are practically in contact with the elstomer thrust ring 55 of the throttling device 27. Piston 45 is in abutment against bottom 41 and the pressure in chamber 51 is zero, whereas the pressure in chamber 48 is the control pressure $P_2$, the pressure in the high pressure chamber 35 is still 10 MPa and the pressure in chambers 36 and 38 is 0.75 MPa.

From this landing gear up position, the operation for lowering the landing gear is as follows: the pilot places chamber 51 in communication with the presssurized hydraulic fluid supply and the annular chamber 48 in communication with the return to the tank. At the end of the manoeuver, rod 40 is extended to a maximum, chamber 51 is filled to the maximum at a pressure higher than 0.5 MPa, with the piston 45 in the mean position, the annular chamber 48 is emptied to a maximum, the pressure which reigns there is practically zero, whereas the pressure in chambers 38 and 36 as again 0.5 MPa and the pressure in the high pressure chamber 35 is still 10 MPa. During this manoeuver, filling of chamber 51 causes the pressure in chamber 38 to increase so that the hydraulic fluid drives pistons 43 and 45 and rod 40 towards the outside of body 12. At the end of the manoeuver, chamber 51 is isolated by closure of a valve controlled by an electrovalve.

After these manoeuvers for raising and powering the landing gear during flight, it will be considered that the landing gear is again in the position under static load of FIG. 10, after landing of the helicopter.

From this position, if it is desired to lower the helicopter for loading it into the hold of a cargo aircraft for example, chamber 51 is placed in communication with the tank of the hydraulic circuit, while the pressure reigning in the annular chamber 48 is low. The weight of the helicopter causes rod 40 to retract from the static position shown in FIG. 10 to the position shown in FIG. 11, piston 45 being moved from its "mean" position to the bottom 41 of rod 40, the pressure in chamber 51 is cancelled out whereas the pressures in chambers 38, 36 and 35 remain equal to the static position pressures of FIG. 10, namely 10 MPa. In fact, retraction of rod 40 into body 12 takes place without practically varying the volume of chamber 38 because piston 45 moves until it abuts against bottom 41. Thus the pressure also varies very little. A position sensor stops this manoeuver in the undercarriage lowered position, which is quite similar to the retracted undercarriage position during flight, with stop 47 and rod 40 abutting against the elastomer ring 55 of the throttling device 27.

It should be noted that partial retraction of rod 40 into body 12 can be obtained, which corresponds to an intermediate static position, by closing the valve sooner which causes emptying of chamber 51.

From the lowered undercarriage position (FIG. 11), if it is desired to come back to the undercarrige down position under static load on the ground (FIG. 10), the following is the procedure to follow: chamber 51 is pressurized and chamber 45 is placed in communication with the tank. Piston 45 moves from bottom 41 to the "mean" position 47, the volume of chamber 38 tends to decrease, the pressure in this chamber increases to a value greater than 10 MPa which corresponds to equilibrium under a static load, and this pressure drives rod 4 outside of body 12. A position detector stops the pressurization of chamber 51 at the end of the maneuver. At this time, the pressures in chambers 35, 36 and 38 are still 10 MPa, whereas the pressure in chamber 51 is greater, for example 11 MPa.

Figures 12, 13:
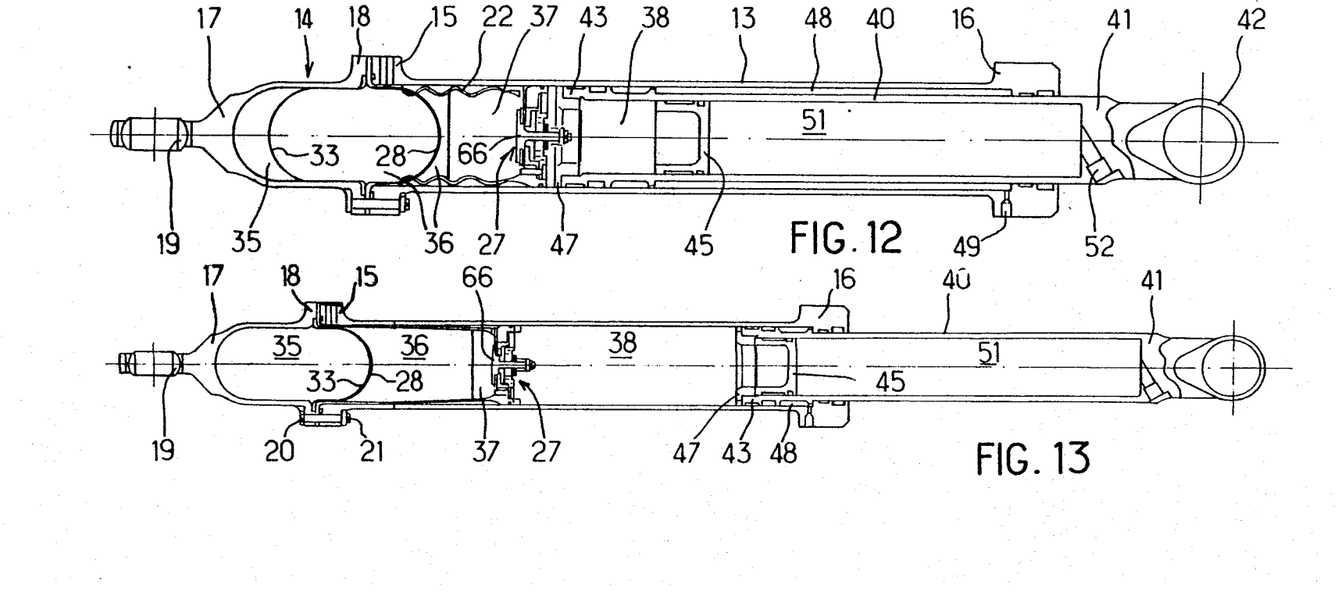

From the under static load position shown in FIG. 10, the helicopter may be raised as shown in FIG. 13 by increasing the pressure in chamber 51 so that this pressure drives piston 45 against stop 47 while compressing the nitrogen in the compression chamber 36 and moving rod 40 in the direction moving it out of tube 13. The result is an extension of the strut and raising of the fuselage with respect to the ground.

Finally, in the case of a crash landing (crash configuration), rod 40 and pistons 43 and 45 penetrate at a very high speed into the cylindrical body 12, so that under the effect of the sudden overpressure in the chamber 38, the overpressure valve 66 opens and hydraulic oil is transferred through the largest possible passage section of chamber 38 towards volume 37 adjacent the gas chambers 36 and 35. After abutting against the elastomer ring 35 of the annular body 53 of the throttling device 27, rod 40 continues to travel towards bottom 17 while taking the throttling device 27 with it, which causes the plastic deformation by buckling of the energy absorbing tube 22 which crumples up while dissipating energy, as shown in FIG. 12. In this configuration, the shock absorbing jack of the invention offers an extra shock absorbing travel to which are added the effects of energy dissipation by plastic deformation of the energy absorber 22.

The arrangement of this shock absorbing jack, whose construction largely uses the composite materials used for construction of the corresponding landing gear, may be reversed if a separator piston is mounted in sleeve 13, between the fluid volume 37 which bathes the throttling device 27 and the low pressure gas chamber 36, so that the swivel end piece 19 may be pivotally mounted on the balance bar and the swivel end piece 42 on the fixed point of the structure.

The shock absorbing jack of the invention, described as being integrated in a strut in a pendulum landing gear, may also be integrated in a direct sliding landing gear leg.

While the invention has been particularly shown and described in reference to preferred embodiments thereof, it will be understood by those skilled in the art that changes in form and details may be made without departing from the spirit and scope of the invention.

What is claimed is:

1. In a shock absorbing jack, for equipping the landing gear of aircraft, and of the type loaded under compression comprising:
    a cylindrical body, an axial end of which is open,
    a hollow cylindrical rod, an axial end of which is open and whose other axial end is closed by a bottom, intended to be connected to an unsuspended member of the landing gear, this rod being engaged by its open axial end portion in the open axial end of the body, and mounted for sealingly sliding therein,
    an annular piston, mounted for sealingly sliding inside the cylindrical body and moving therein with the rod portion internal to the body, while defining between the body and the rod an annular retraction chamber, which the annular piston isolates from a hydraulic fluid chamber contained in the body, the pressurized hydraulic fluid supply of the annular retraction chamber controlling retraction of the rod into the body, whereas emptying thereof causes extension of the rod from the body,
    a separator piston, mounted for sealingly sliding and between two stops inside the rod in which is defined an extension chamber which the separator piston isolates from the hydraulic fluid contained in the body, and which, when it is supplied with pressurized hydraulic fluid, controls the extension of the rod out of the body, whereas emptying thereof causes the rod to retract into the body,
    a low pressure gas chamber, compressed by an adjacent volume of hydraulic fluid when the hydraulic fluid contained in the body is compressed by the annular piston and the separator piston, under the effect of compression loads exerted on the shock absorbing jack and causing the rod to retract into the body,
    a throttling device, housed in the body and braking the movements of the rod by throttling the hydraulic fluid contained therein, and
    a high pressure gas chamber, also housed in the body in which it is defined between a fixed wall of the body and a separator member which isolates it from the hydraulic fluid and from the low pressure gas chamber, and which is compressed as soon as the shock absorbing jack is subjected to a compression force greater than a threshold corresponding to a pressure of the gas in the low pressure chamber equal to the inflation pressure of the high pressure gas chamber, wherein said low pressure gas chamber is housed in the body, between the throttling device and the high pressure gas chamber, from which it is only separated by the separator member, comprising a flexible membrane which bears, as long as the pressure of the gas in the low pressure chamber is not greater than the inflation pressure of the high pressure hamber, against a rigid and perforated support, fixed to the cylinder, and allowing the transmission of pressure from the low pressure chamber to the high pressure chamber through the membrane, while completely limiting the deformation of the membrane towards the low pressure chamber and the throttling device.

2. The shock absorbing jack as claimed in claim 1, wherein said rigid perforated support is an internal dividing wall substantially transversal to the body and which has a hemispherical bottom, whose concavity is turned towards the high pressure chamber, and pierced with a plurality of passage orifices.

3. The shock absorbing jack as claimed in claim 2, wherein said flexible membrane is made from a rubbery, resiliently deformable material and has a central part, which, in the rest position of the shock absorbing jack, has a hemispherical shape bearing against the concave face of the hemispherical bottom of the rigid perforated dividing wall.

4. The shock absorbing jack as claimed in claim 1, wherein said fixed wall of the body which cooperates with the membrane for defining said high pressure chamber is formed by a fixed bottom closing the axial end of the body on the side opposite the open end in which said rod is engaged.

5. The shock absorbing jack as claimed in claim 4, wherein the body is formed by the axial assembly of a cylindrical sleeve and an end piece which has an internal recess, housing the high pressure chamber, said end piece being closed on the side opposite the sleeve by a bottom with internal hemispherical wall and opening into the sleeve through one end of the end piece which has a radial external flange by which the end piece is fixed to an external radial flange of the opposite end of the sleeve.

6. The shock absorbing jack as claimed in one of claims 1 to 5, wherein said membrane, has a peripheral part by which it is sealingly fixed to the body.

7. The shock absorbing jack as claimed in claim 5, wherein said membrane has a peripheral portion by which said membrane is sealingly fixed to the body comprising an annular bead which is nipped between the flanges fixing the sleeve to the end piece.

8. The shock absorbing jack as claimed in claim 2, wherein said rigid perforated support has a peripheral edge by which it is fixed to the body.

9. The shock absorbing jack as claimed in claim 8, wherein said peripheral edge by which said perforated rigid support is fixed to the body is an annular collar nipped between the flanges fixing the sleeve to the end piece and projecting radially outwardly from a truncated cylinder engaged in the sleeve and connected to the hemispherical bottom.

10. The shock absorbing jack as claimed in claim 5 wherein the throttling device is positioned in the body by a plastic deformation energy absorber, which is only actuated after said rod has come into contact with said throttling device.

11. The shock absorbing as claimed in claim 10, wherein said energy absorber is a tubular member, engaged in the cylindrical sleeve of the body, and secured to the throttling device by an axial end situated on said rod side, whereas its axial end situated on the end piece side has an external radial flange which is clamped between the fixing flanges of the sleeve and the end piece.

12. The shock absorbing jack as claimed in claim 1, wherein said throttling device comprises a throttling valve and orifice assembly having a passage section which is selectively variable as a function of the pressure of the hydraulic fluid and/or of the speed at which said rod is driven into said body, and of the passage direction of the hydraulic fluid.

13. The shock absorbing jack as claimed in claim 1, wherein said throttling device comprises an annular body for positioning a throttling valve and orifice assembly in the cylindrical body, and forming a stop limiting the penetration of said rod into said cylindrical body, under normal conditions of use of the shock absorbing jack, said annular body being disposed transversally in the cylindrical body and sealingly mounted by its external lateral wall therein, and the throttling valve and orifice assembly being mounted inside the annular body.

14. The shock absorbing jack as claimed in one of claim 12 or 13, wherein said throttling valve and orifice assembly comprises a first disk pierced with a plurality of small throttling orifices and disposed transversally in a fixed position in the body, as well as a expansion braking valve, disposed on the same side as the first disk which is turned towards the gas chambers, and movable between two positions, one of which is a position spaced apart from the first disk, in which the braking valve is brought by compression of the hydraulic fluid, possibly beyond a first threshold, resulting from the penetration of the rod into the body, so as to allow throttling under compression through the small orifices in the first disk, and the other position of which is a position applied to the first disk, in which the braking valve is caused, by expansion of at least one gas chamber, to close some of the small orifices in the first disk so as to allow throttling on expansion through the unclosed orifices only in the first disk and to brake the extending movement of the rod from the cylindrical body.

15. The shock absorbing jack as claimed in claim, 14, wherein said first disk is also pierced with at least one large orifice, having a passage section very much greater than that of the small throttling orifices, and which is normally closed by the obturator of an over pressure valve resiliently urged so as to apply the obturator against said first disk, the over pressure valve being moved against resilient means which drive it to move the obturator away from the first disk and to allow the hydraulic fluid to pass through the large orifice or orifices, should an over pressure occur caused by the rod being driven at high speed into the body and exceeding an actuation threshold of the resilient means.

16. The shock absorbing jack as claimed in claim 15, wherein the obturator of said over pressure valve is disposed on the side of the first disk which is turned towards the gas chambers, and forms simultaneously an overpressure piston which is subjected to the presssure of the hydraulic fluid passing through the large orifice or orifices and on which a resultant force is exerted, antagonistic to the action of the resilient means urging the overpressure valve in the closure direction.

17. The shock absorbing jack as claimed in claim 16, wherein said over pressure valve forms simultaneously a support on which the expansion braking valve is movably mounted.

18. The shock absorbing jack as claimed in claim 17, wherein the expanding braking valve is in the form of a circular ring having closure tongues projecting radially outwardly and each intended to close respectively one of those of the small throttling orifices which are to be closed by the expansion braking valve.

19. The shock absorbing jack as claimed in claim 18, wherein the expansion braking valve is mounted for pivoting by its internal radial edge in a peripheral groove opening radially outwardly and on the overpressure valve.

20. The shock absorbing jack as claimed in claim 19, wherein the the small throttling orifices are evenly spaced on the first pierced disk, about a single large orifice and the over pressure valve has substantially the form of a mushroom, whose cap has an internal radial part which forms the obturator and the over pressure piston which is separated by the peripheral groove, in which the internal radial edge of the expansion braking valve is engaged, from an external radial annular part forming a stop for the expansion braking valve when this latter is moved away from the first disk, and the foot of the mushroom shaped over pressure valve extends axially, with a considerable radial clearance, through the large orifice and is mounted for sliding through a second disk pierced with throttling orifices of a passage section greater than that of the small orifices in the first pierced disk and spaced axially from the first disk on the side turned towards said rod, the end of the foot projecting towards the rod beyond the second disk and being threaded, and a nut being screwed onto this threaded end of the foot and forming a stop, against which bears one end of a compression spring whose other end bears against the second disk so as to return the over pressure valve axially towards the rod, for applying the obturator against the first pierced disk.

21. The shock absorbing jack as claimed in claim 20, wherein said first and second pierced disks are the central disks of two plate shaped members clamped one against the other by their peripheral parts which are retained by members fixing the throttling device on the tubular body.

22. The shock absorbing jack as claimed in claim 1, wherein the bottom of the rod is integrally coupled with a swivelling end piece for pivotally mounting on a non-suspended member of a landing gear of an aircraft, and wherein in another end of the rod, the bottom of the cylindrical body of said shock absorbing jack is secured to a swivelling end piece for pivotally mounting on a suspended structural member connected to the structure of the aircraft.

23. The shock absorbing jack as claimed in claim 22, wherein the swivelling end piece for equipping one end of said shock absorbing jack is pivotally mounted on a leg of a pendulum landing gear of an aircraft between at least one wheel provided for the end of said leg and the fixing and pivoting point of said leg on the structure of the aircraft, and wherein the another end of said shock absorbing jack, the swivelling end piece secured with said jack, is pivotally mounted on a structural member of the aircraft for providing said shock absorbing jack with the bracing and working member of said pendulum landing gear.

* * * * *